(12) United States Patent
Boies et al.

(10) Patent No.: US 6,941,474 B2
(45) Date of Patent: Sep. 6, 2005

(54) FIREWALL SUBSCRIPTION SERVICE SYSTEM AND METHOD

(75) Inventors: Stephen J. Boies, Mahopac, NY (US); Samuel H. Dinkin, Austin, TX (US); Paul A. Moskowitz, Yorktown Heights, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 09/790,065

(22) Filed: Feb. 20, 2001

(65) Prior Publication Data

US 2002/0116607 A1 Aug. 22, 2002

(51) Int. Cl.[7] .............................. H04L 9/00; G06F 15/16
(52) U.S. Cl. ...................................... 713/201; 709/225
(58) Field of Search ................................. 713/153, 166, 713/200, 201; 709/217, 219, 223–225, 227, 229, 230, 232

(56) References Cited

U.S. PATENT DOCUMENTS

| 5,958,016 A | * | 9/1999 | Chang et al. ............... 709/229 |
| 6,012,088 A | * | 1/2000 | Li et al. ..................... 709/219 |
| 6,442,588 B1 | * | 8/2002 | Clark et al. ................. 709/203 |
| 6,453,348 B1 | * | 9/2002 | Barnier et al. .............. 709/225 |
| 6,466,976 B1 | * | 10/2002 | Alles et al. ................. 709/224 |

OTHER PUBLICATIONS

Bellovin, Steven M. and William R. Cheswick. "Network Firewalls." IEEE Communications Magazine, vol. 32, Issue 9. Sep. 1994. pp. 50–57.*

* cited by examiner

Primary Examiner—Andrew Caldwell
Assistant Examiner—Zachary A Davis
(74) Attorney, Agent, or Firm—Duke W. Yee; Stephen C. Kaufman; Lisa L. B. Yociss

(57) ABSTRACT

A method and system are described for creating and maintaining a firewall subscription service. A firewall is established within the firewall service. Customers are permitted to subscribe to the firewall subscription service. Each subscriber is an independent, paying party. A subscriber may subscribe to protect one or more computer systems. The firewall offers a particular level of security to a subscriber's computer systems when the subscriber's computer systems are communicating with an external network. All communications transmitted to any of the subscriber's computer systems utilizing the external network are received first by the firewall. The firewall is utilized to protect the subscriber's computer systems when the subscriber's computer systems receive communications transmitted utilizing the external network.

27 Claims, 4 Drawing Sheets

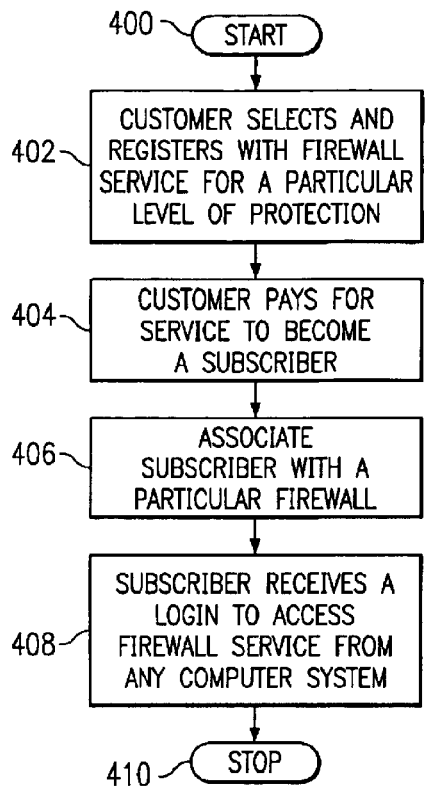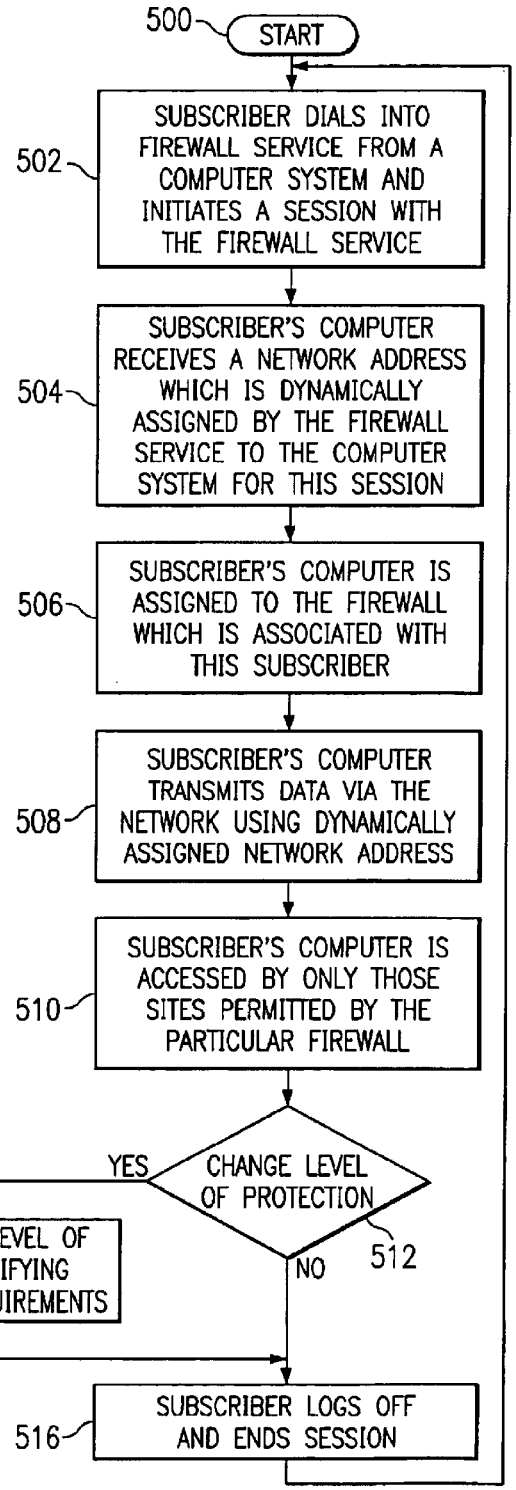

FIREWALL SUBSCRIPTION SERVICE SYSTEM AND METHOD

BACKGROUND OF THE INVENTION

1. Technical Field

The present invention relates in general to apparatus and methods for providing a firewall subscription service. More particularly, the present invention provides apparatus and methods for providing a firewall subscription service which protects customer computer systems, where the firewall subscription service includes a firewall between the customer computer systems and an external network.

2. Description of Related Art

Firewalls are known in the art to protect a network of computers when one or more of these computers are being accessed by an external network. For example, a company may have computer systems coupled together utilizing a company computer network. When these company computer systems are communicating with each other utilizing the company computer network, the likelihood of unauthorized attempts to access one of the company computers is low. This likelihood rises dramatically, however, when one of the company computer systems is coupled to an external network and receiving communications utilizing that external network. A firewall may be installed between the external network and the company's network of computer systems. The firewall then can be used to protect the company's computer systems against unauthorized accesses transmitted via the external network.

A firewall is typically implemented in a proxy server which is outside of the company's computer network. Communications transmitted to any of the customer's computer systems via the external network are routed through the firewall in the proxy server. The firewall then determines whether or not to forward the communications to the customer computer systems.

A problem arises, however, when an individual user, such as a home office user, is coupled to the external network. The home office computer is vulnerable to attacks from the external network. It is difficult, however, for home office computer users, such as individual computer users, to implement a firewall.

Therefore, a need exists for a firewall subscription service and method to which different customers may subscribe for protecting the customers' computers, where each subscriber is an independent, paying party.

SUMMARY OF THE INVENTION

A method and system are described for creating and maintaining a firewall subscription service. A firewall is established within the firewall service. Customers are permitted to subscribe to the firewall subscription service. Each subscriber is an independent, paying party. A subscriber may subscribe to protect one or more computer systems. The firewall offers a particular level of security to a subscriber's computer systems when the subscriber's computer systems are communicating with an external network. All communications transmitted to any of the subscriber's computer systems utilizing the external network are received first by the firewall. The firewall is utilized to protect the subscriber's computer systems when the subscriber's computer systems receive communications transmitted utilizing the external network.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 illustrates a high level flow chart which depicts a subscriber registering with a firewall service and being associated with one of a plurality of different firewalls in accordance with the present invention;

FIG. 5 depicts a high level flow chart which illustrates a subscriber utilizing an external network through a firewall service in accordance with the present invention.

DETAILED DESCRIPTION OF THE PREFERRED EMBODIMENT

A preferred embodiment of the present invention and its advantages are better understood by referring to FIGS. 1–6 of the drawings, like numerals being used for like and corresponding parts of the accompanying drawings.

The invention is preferably realized using a well-known computing platform, such as an IBM RS/6000 workstation running the IBM AIX operating system. However, it may be realized in other popular computer system platforms, such as an IBM personal computer running the Microsoft Windows operating system or a Sun Microsystems workstation running alternate operating systems such as UNIX or LINUX, without departing from the spirit and scope of the invention.

The present invention is a method and system for creating and maintaining a firewall subscription service. The firewall subscription service includes one or more firewalls. Each of these firewalls offers a different level of protection to subscribers when the subscriber's computer is communicating with an external network.

Customers may subscribe to the firewall service and be associated with one of these firewalls. When a computer being utilized by a subscriber is coupled to the external network, the firewall associated with this subscriber receives all requests transmitted utilizing the external network to access the subscriber's computer system. The firewall will then either prohibit access to the computer system by discarding the request, or will permit access to the computer system by forwarding the request to the computer system.

Figure 1:
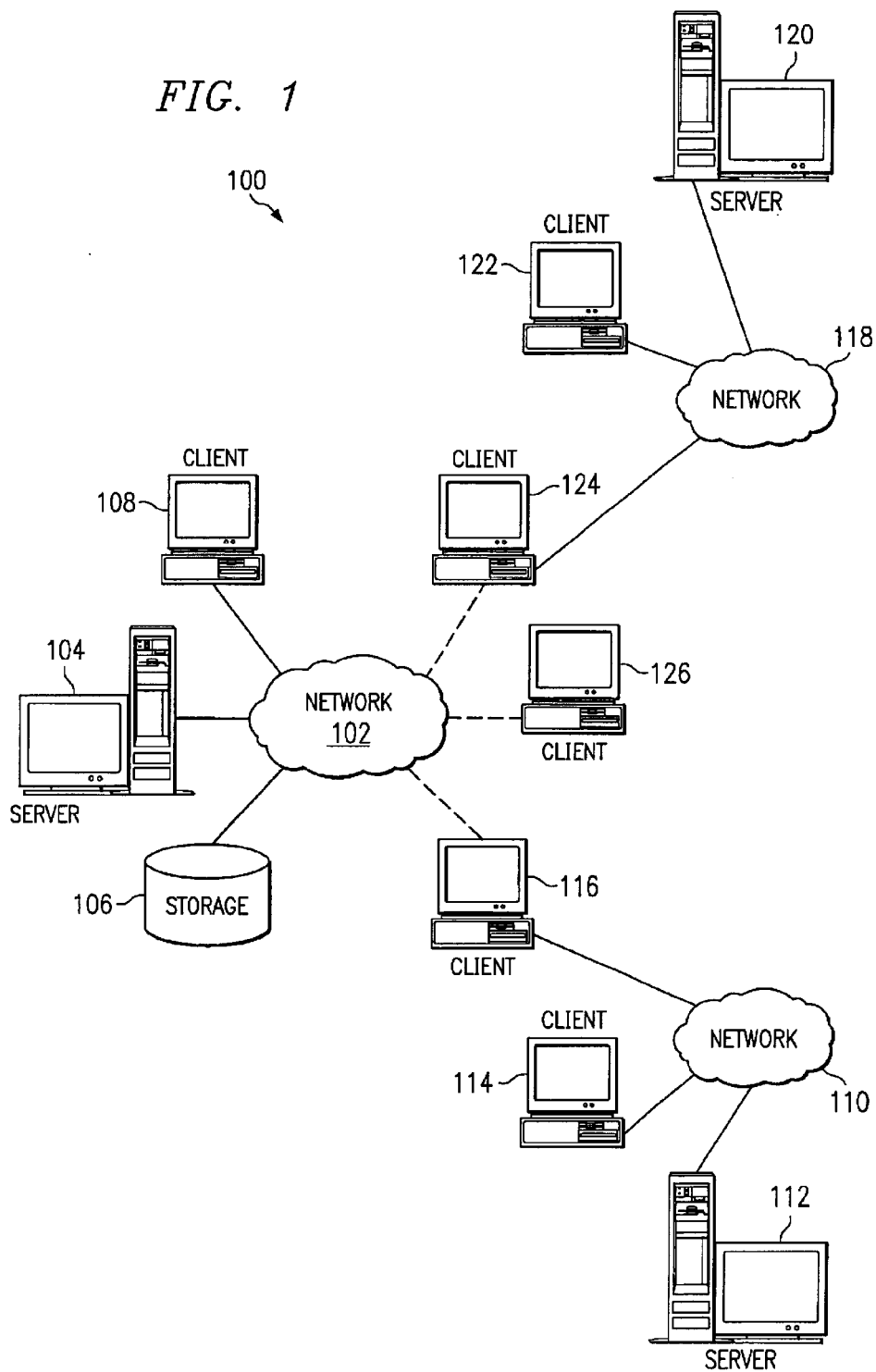
FIG. 1 is a diagram illustrating a distributed data processing system according to the present invention.

FIG. 1 depicts a pictorial representation of a distributed data processing system in which the present invention may be implemented. Distributed data processing system 100 includes several networks, each of which is a medium used to provide communications links between various devices and computers connected to the network. Any of the networks may include permanent connections, such as wire or fiber optic cables, or temporary connections made through telephone connections.

Network 102 is preferably implemented as an external network, such as the Internet. Server 104, storage unit 106, and client 108 are coupled to network 102.

Network 110 is preferably implemented as a first customer network, such as an intranet. Server 112 and clients 114 and 116 are coupled to network 110.

Network 118 is preferably implemented as a second customer network, such as an intranet. The first and second computer networks are separate and apart from each other, and from external network 102. Server 120 and clients 122 and 124 are coupled to network 118.

According to a preferred embodiment of the present invention, a firewall subscription service is provided and executes within server 104. A first subscriber has paid for the service to protect client 116. A second, different subscriber is has paid for the service to protect client 124. And, a third, different subscriber has paid for the service to protect client 126. Clients 116, 124, and 126 are coupled to network 102 utilizing the firewall service as depicted by dashed lines and as described below in greater detail.

A single subscriber might pay for the service to protect multiple computer systems. For example, a subscriber might pay for the service to protect all client computer systems 122 and 124 coupled to network 118. Similarly, a subscriber might pay for the service to protect all client computer systems 114 and 116 coupled to network 110. A subscriber might pay for the service to protect only a single computer system, such as client 126.

Any of the clients, may be, for example, personal computers, network computers, personal digital assistants, data network compatible cellular devices, cable or satellite TV set-top boxes, Internet ready game consoles, and the like. For purposes of this application, a network computer is any computer coupled to a network which receives a program or other application from another computer coupled to the network. Server 104 provides data, such as boot files, operating system images and applications, to its client 108. Client 108 is a client to server 104.

Server 112 provides data, such as boot files, operating system images and applications, to its clients 114 and 116. Clients 114 and 116 are clients to server 112.

Server 120 provides data, such as boot files, operating system images and applications, to its clients 122 and 124. Clients 122 and 124 are clients to server 112.

A customer utilizing client 116 has subscribed to the firewall service. Client 116 is, therefore, capable of receiving communications from network 102 as permitted by the firewall associated with this subscriber. A second customer, utilizing client 126 has also subscribed to the firewall service. Client 126 is, therefore, capable of receiving communications from network 102 as permitted by the firewall associated with the second subscriber. And, a third customer, utilizing client 124 has also subscribed to the firewall service. Client 124 is, therefore, capable of receiving communications from network 102 as permitted by the firewall associated with the third subscriber. These three subscribers are separate individuals or entities. The three subscribers have each paid independently, and separately from one another for the firewall subscription service.

Clients 116, 124, and 126 and customer networks 110 and 118 are protected from threats transmitted utilizing network 102 through the firewall service.

In the preferred embodiment, network 102 is the Internet. Network 102 represents a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages.

Distributed data processing system 100 may include additional servers, clients, and other devices not shown. FIG. 1 is intended as an example and not as an architectural limitation for the processes of the present invention.

Figure 2:
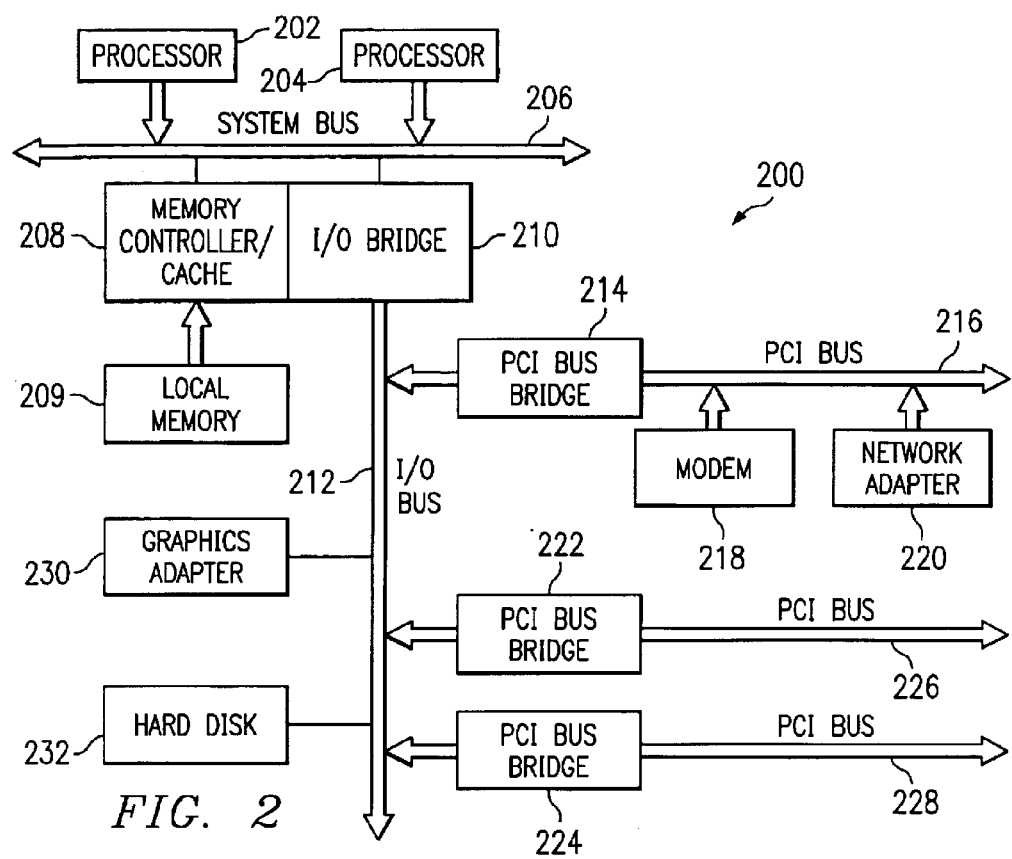
FIG. 2 is an exemplary block diagram of a server according to the present invention.

Referring to FIG. 2, a block diagram of a data processing system which may be implemented as one or each of the servers of FIG. 1 is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/ cache 208, which provides an interface to local memory 209. I/O bus bridge 210 is connected to system bus 206 and provides an interface to I/O bus 212. Memory controller/ cache 208 and I/O bus bridge 210 maybe integrated as depicted. Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

Figure 3:
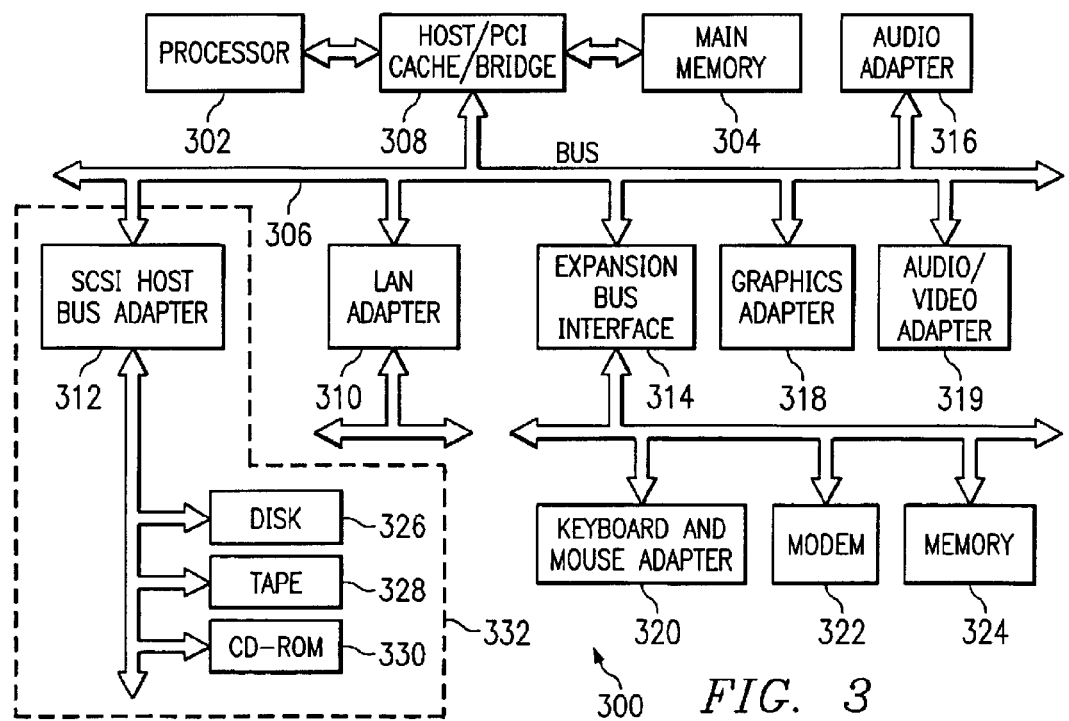
FIG. 3 is an exemplary block diagram of a client according to the present invention.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel or ISA, may be used.

Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection.

In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324.

In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. Windows is a trademark of Microsoft Corporation.

An object oriented programming system, such as Java, may ran in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

FIG. 4 illustrates a high level flow chart which depicts a customer registering with a firewall service and being associated with one of a plurality of different firewalls in accordance with the present invention. The process starts as depicted by block 400 and thereafter passes to block 402 which illustrates a customer selecting and registering with a firewall service for a particular level of protection. Block 404 illustrates the customer paying for the firewall service and thus becoming a subscriber. Thereafter, block 406 depicts the firewall service associating the subscriber with a particular firewall which provides the selected level of protection. Next, block 408 depicts the subscriber receiving a log-in for the subscriber to use to access the service. The subscriber may use the log-in to access the service from any computer system. The process then terminates as illustrated by block 410.

FIG. 5 depicts a high level flow chart which illustrates a subscriber utilizing a network through a firewall service in accordance with the present invention. The process starts as depicted by block 500 and thereafter passes to block 502 which illustrates the subscriber dialing into and initiating a session with the firewall service from a computer system. The process then passes to block 504 which depicts the subscriber's computer receiving a network address which is dynamically assigned to the subscriber's computer by the firewall service for this session. Next, block 506 illustrates the subscriber's computer being assigned to the firewall which is associated with this subscriber. Thereafter, block 508 depicts the subscriber's computer transmitting data via the network using the dynamically assigned network address. Block 510, then, depicts the subscriber's computer being accessed by only those sites which are permitted by the particular firewall. Next, block 512 illustrates a determination of whether or not the subscriber wishes to change the level of protection. If a determination is made that the subscriber does not wish to change the level of protection, the process passes to block 516. Referring again to block 512, if a determination is made that the subscriber wishes to change the level of protection, the process passes to block 514 which depicts the subscriber requesting a new level of service and specifying protection requirements. Thereafter, block 516 illustrates the subscriber's computer logging off and ending this session. The process then passes back to block 502.

Figure 6:
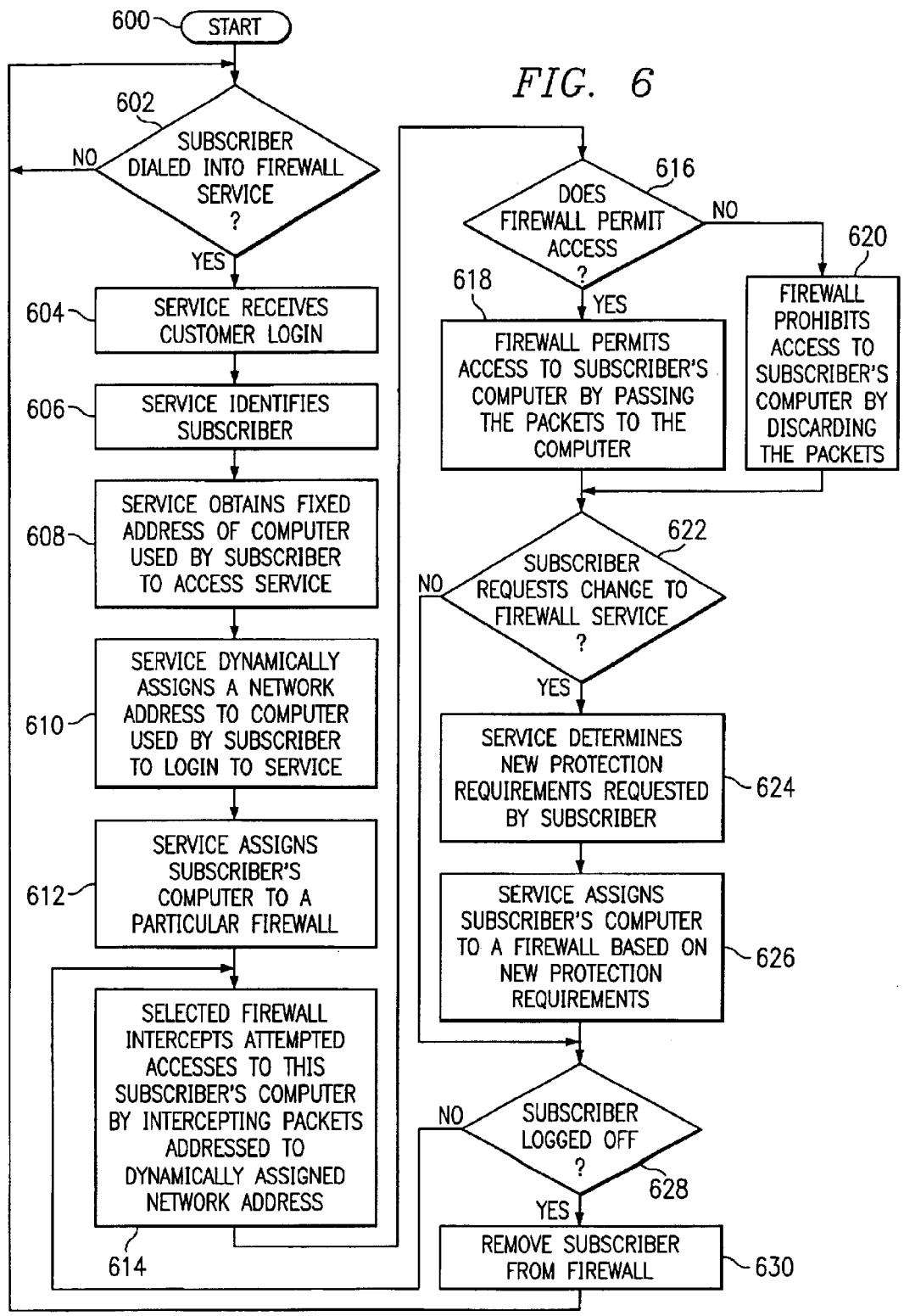
FIG. 6 illustrates a high level flow chart which depicts a firewall included within a firewall service limiting access to a computer system which is being utilized by a subscriber in accordance with the present invention.

FIG. 6 illustrates a high level flow chart which depicts a firewall included within a firewall service limiting access to a computer system which is utilized by a subscriber in accordance with the present invention. The process starts as depicted by block 600 and thereafter passes to block 602 which illustrates a determination of whether or not a subscriber's computer has dialed into the firewall service. If a determination is made that no subscriber has dialed into the firewall service, the process passes back to block 602. If a determination is made that a subscriber's computer has dialed into the firewall service, the process passes to block 604 which depicts the service receiving a customer login. Next, block 606 illustrates the service identifying the subscriber and the subscriber's associated firewall using the login. Thereafter, block 608 depicts the service obtaining the fixed address of the computer used by the subscriber to dial into the firewall service. The process then passes to block 610 which illustrates the service dynamically assigning a network address to the computer used by the subscriber to access the firewall service. Next, block 612 depicts the service assigning the subscriber's computer to a particular firewall. The firewall assigned by the service is the firewall associated with this subscriber.

The process then passes to block 614 which depicts the selected firewall intercepting attempted accesses to this subscriber's computer by intercepting network packets which are addressed to the address dynamically assigned to the subscriber's computer system. Block 616, then, illustrates a determination of whether or not the firewall will permit access to the subscriber's computer system. If a determination is made that the firewall will permit access to the subscriber's computer, the process passes to block 618 which depicts the firewall permitting access to the subscriber's computer. Access is permitted by passing these packets to the computer system. The process then passes to block 622.

Referring again to block 616, if a determination is made that the firewall will not permit access to the subscriber's computer system, the process passes to block 620 which illustrates the firewall prohibiting access to the subscriber's computer. Access is prohibited by discarding these packets. The process then passes to block 622.

Block 622, then, depicts a determination of whether or not the subscriber has requested a change to its level of protection provided by the firewall service. If a determination is made that the subscriber has not requested a change to its level of protection, the process passes to block 628. Referring again to block 622, if a determination is made that the subscriber has requested a change to its level of protection, the process passes to block 624 which depicts the firewall service determining the protection requirements requested by the subscriber. Next, block 626 illustrates the firewall service assigning the subscriber to a new firewall based on the new protection requirements. Thereafter, block 628 depicts a determination of whether or not the subscriber has logged off from the firewall service. If a determination is made that the subscriber has not logged off, the process passes to block 614. Referring again to block 628, if a determination is made that the subscriber has logged off, the process passes to block 630 which illustrates the removal of the subscriber from the firewall. The process then passes to block 602.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating and maintaining a firewall subscription service, said method comprising the steps of:

permitting customers to subscribe to said firewall subscription service, said firewall subscription service providing a plurality of different firewalls;

subscribing, by a particular subscriber, to said firewall subscription service;

associating one of said plurality of different firewalls with said particular subscriber, said one of said plurality of firewalls being unrelated to and not associated with any one of a plurality of different computer systems;

accessing, by said particular subscriber, said firewall subscription service from one of said plurality of different computer systems;

initiating a session with said firewall subscription service in response to said particular subscriber accessing said firewall subscription service;

identifying, by said firewall subscription service, said particular subscriber;

selecting, by said firewall subscription service utilizing said identity of said particular subscriber, said one of said plurality of firewalls that is associated with said particular subscriber;

said one of said plurality of firewalls being selected regardless of which one of said plurality of said plurality of different computer systems is used by said particular subscriber to access said firewall subscription service;

dynamically and temporarily assigning, by said firewall subscription service, said one of said plurality of different firewalls to said one of said plurality of computer systems used by said particular subscriber to access said firewall subscription service, said assignment of said one of said plurality of different firewalls to said one of said plurality of computer systems being temporary and lasting only during said session;

said one of said plurality of firewalls offering a particular level of security to said one of said plurality of computer systems utilized by said subscriber when said one of said plurality of computer systems is communicating with an external network, said one of said plurality of firewalls receiving all communications transmitted to said one of said plurality of computer systems utilizing said external network, wherein all said communications transmitted to said one of said plurality of computer systems utilizing said external network are received first by said one of said plurality of firewalls; and utilizing said one of said plurality of firewalls to protect said one of said plurality of computer systems when said one of said plurality of computer systems receive communication utilizing said external network.

2. The method according to claim 1, further comprising the step of permitting customers to subscribe to said firewall subscription service, each one of said customers paying for said firewall service independently from all others of said customers.

3. The method according to claim 1, further comprising the steps of:

intercepting, utilizing said one of said plurality of firewalls, each request transmitted utilizing said external network to access said one of said plurality of computer systems;

determining, utilizing said one of said plurality of firewalls, whether to forward each request to said one of said plurality of computer systems;

in response to a determination to forward a request, permitting access, utilizing said one of said plurality of firewalls, to said one of said plurality of computer systems; and in response to a determination to not forward a request, prohibiting access, utilizing said one of said plurality of firewalls, to said one of said plurality of computer systems.

4. The method according to claim 1, further comprising the step of establishing said plurality of different firewalls within said firewall service, each one of said plurality of different firewalls offering a different level of security to one of said plurality of computer systems.

5. The method according to claim 4, further comprising the steps of:

permitting a first subscriber utilizing a first one of said plurality of computer systems to subscribe to said firewall subscription service to utilize a first one of said plurality of different firewalls, wherein said first one of said plurality of computer systems receives a first level of security; and permitting a second subscriber utilizing a second one of said plurality of computer systems to subscribe to said firewall subscription service to utilize a second one of said plurality of different firewalls, wherein said second one of said plurality of computer systems receives a second level of security.

6. The method according to claim 4, further comprising the step of assigning a unique login identifier to each of said customers who subscribed to said firewall subscription service, said unique login identifier being used to uniquely identify each of said subscribers.

7. The method according to claim 6, further comprising the steps of:
receiving, utilizing said firewall subscription service, a login identifier;
identifying, utilizing said firewall subscription service, one of said subscribers utilizing said login identifier;
determining, utilizing said firewall subscription service, one of said plurality of different firewalls which is associated with said one of said subscribers;
identifying, utilizing said firewall subscription service, a client computer system currently being utilized by said one of said subscribers; and
utilizing said one of said plurality of different firewalls to protect said client customer computer system when said client computer system is coupled to said external network through said one of said plurality of different firewalls.

8. The method according to claim 7, further comprising the steps of:
determining a fixed network address of said client computer system currently being utilized by said one of said subscribers;
assigning a dynamic network address to said client computer system, said client computer system utilizing said dynamic network address when communicating utilizing said external network; and
intercepting, utilizing said one of said plurality of different firewalls, each transmission from said external network to said dynamic network address.

9. The method according to claim 4, further comprising the steps of:
permitting said subscriber to select said one of said plurality of different firewalls;
utilizing said one of said plurality of different firewalls to intercept communications transmitted via said external network to a client computer system being utilized by said subscriber;
permitting said subscriber to select a different one of said plurality of different firewalls; and
in response to a selection of said different one of said plurality of different firewalls, utilizing said different one of said plurality of different firewalls to intercept communications transmitted via said external network to said client computer system being utilized by said subscriber.

10. A system for creating and maintaining a firewall subscription service, comprising:
means for permitting customers to subscribe to said firewall subscription service, said firewall subscription service providing a plurality of different firewalls;
a particular subscriber subscribing to said firewall subscription service;
one of said plurality of different firewalls being associated with said particular subscriber, said one of said plurality of firewalls being unrelated to and not associated with any one of a plurality of different computer systems;
said particular subscriber accessing said firewall subscription service from one of said plurality of different computer systems;
a session being initiated with said firewall subscription service in response to said particular subscriber accessing said firewall subscription service;
said firewall subscription service identifying said particular subscriber,
said firewall subscription service selecting, utilizing said identity of said particular subscriber, said one of said plurality of firewalls that is associated with said particular subscriber;
said one of said plurality of firewalls being selected regardless of which one of said plurality of said plurality of different computer systems is used by said particular subscriber to access said firewall subscription service;
said firewall subscription service dynamically and temporarily assigning said one of said plurality of different firewalls to said one of said plurality of computer systems used by said particular subscriber to access said firewall subscription service, said assignment of said one of said plurality of different firewalls to said one of said plurality of computer systems being temporary and lasting only during said session;
said one of said plurality of firewalls offering a particular level of security to said one of said plurality of computer systems utilized by said subscriber when said one of said plurality of computer systems is communicating with an external network, said one of said plurality of firewalls receiving all communications transmitted to said one of said plurality of computer systems utilizing said external network, wherein all said communications transmitted to said one of said plurality of computer systems utilizing said external network are received first by said one of said plurality of firewalls; and
said one of said plurality of firewalls being utilized to protect said one of said plurality of computer systems when said one of said plurality of computer systems receive communications utilizing said external network.

11. The system according to claim 10, further comprising means for permitting customers to subscribe to said firewall subscription service, each one of said customers paying for said firewall service independently from all others of said customers.

12. The system according to claim 10, further comprising:
said one of said plurality of firewalls for intercepting each request transmitted utilizing said external network to access said one of said plurality of computer systems;
said one of said plurality of firewalls for determining whether to forward each request to said one of said plurality of computer systems;
in response to a determination to forward a request, said one of said plurality of firewalls for permitting access to said one of said plurality of computer systems; and
in response to a determination to not forward a request, said one of said of plurality of firewalls for prohibiting access to said one of said plurality of computer systems.

13. The system according to claim 10, further comprising said plurality of different firewalls being established within said firewall service, each one of said plurality of different firewalls offering a different level of security to one of said plurality of computer systems.

14. The system according to claim 13, further comprising:
means for permitting a first subscriber utilizing a first one of said plurality of computer systems to subscribe to said firewall subscription service to utilize a first one of said plurality of different firewalls, wherein said first one of said plurality of computer systems receives a first level of security; and means for permitting a second subscriber utilizing a second one of said plurality of computer systems to subscribe to said firewall subscription service to utilize a second one of said plurality of different firewalls, wherein said second one of said plurality of computer systems receives a second level of security.

15. The system according to claim 13, further comprising a unique login identifier being assigned to each of said customers who subscribed to said firewall subscription service, said unique login identifier being used to uniquely identify each of said subscribers.

16. The system according to claim 15, further comprising:

said firewall subscription service for receiving a login identifier;

said firewall subscription service for identifying one of said subscribers utilizing said login identifier;

said firewall subscription service for determining one of said plurality of different firewalls which is associated with said one of said subscribers;

said firewall subscription service for identifying a client computer system currently being utilized by said one of said subscribers; and said one of said plurality of different firewalls being utilized to protect said client customer computer system when said client computer system is coupled to said external network through said one of said plurality of different firewalls.

17. The system according to claim 16, further comprising:

said firewall subscription service for determining a fixed network address of said client computer system currently being utilized by said one of said subscribers;

said firewall subscription service for assigning a dynamic network address to said client computer system, said client computer system utilizing said dynamic network address when communicating utilizing said external network; and said one of said plurality of different firewalls for intercepting each transmission from said external network to said dynamic network address.

18. The system according to claim 13, further comprising:

means for permitting said subscriber to select said one of said plurality of different firewalls;

said one of said plurality of different firewalls being utilized to intercept communications transmitted via said external network to a client computer system being utilized by said subscriber;

means for permitting said subscriber to select a different one of said plurality of different firewalls; and in response to a selection of said different one of said plurality of different firewalls, said different one of said plurality of different firewalls being utilized to intercept communications transmitted via said external network to said client computer system being utilized by said subscriber.

19. A computer program product stored in a computer-readable medium for creating and maintaining a firewall subscription service, said computer program product comprising:

instruction means for permitting customers to subscribe to said firewall subscription service, said firewall subscription service providing a plurality of different firewalls;

instruction means for subscribing, by a particular subscriber, to said firewall subscription service;

instruction means for associating one of said plurality of different firewalls with said particular subscriber, said one of said plurality of firewalls being unrelated to and not associated with any one of a plurality of different computer systems;

instruction means for accessing, by said particular subscriber, said firewall subscription service from one of said plurality of different computer systems;

instruction means for initiating a session with said firewall subscription service in response to said particular subscriber accessing said firewall subscription service;

instruction means for identifying, by said firewall subscription service, said particular subscriber;

instruction means for selecting, by said firewall subscription service utilizing said identity of said particular subscriber, said one of said plurality of firewalls that is associated with said particular subscriber;

said one of said plurality of firewalls being selected regardless of which one of said plurality of said plurality of different computer systems is used by said particular subscriber to access said firewall subscription service;

instruction means for dynamically and temporarily assigning, by said firewall subscription service, said one of said plurality of different firewalls to said one of said plurality of computer systems used by said particular subscriber to access said firewall subscription service, said assignment of said one of said plurality of different firewalls to said one of said plurality of computer systems being temporary and lasting only during said session;

instruction means for said one of said plurality of firewalls offering a particular level of security to said one of said plurality of computer systems utilized by said subscriber when said one of said plurality of computer systems is communicating with an external network, said one of said plurality of firewalls receiving all communications transmitted to any of said one of plurality of computer systems utilizing said external network, wherein all said communications transmitted to said one of said plurality of computer systems utilizing said external network are received first by said one of said plurality of firewalls; and instruction means for utilizing said one of said plurality of firewalls to protect said one of said plurality of computer systems when said one of said plurality of computer systems receive communications utilizing said external network.

20. The product according to claim 19, further comprising instruction means for permitting customers to subscribe to said firewall subscription service, each one of said customers paying for said firewall service independently from all others of said customers.

21. The product according to claim 19, further comprising:

instruction means for intercepting, utilizing said one of said plurality of firewalls, each request transmitted utilizing said external network to access said one of said plurality of computer systems;

instruction means for determining, utilizing said one of said plurality of firewalls, whether to forward each request to said one of said plurality of computer systems;

in response to a determination to forward a request, permitting access, instruction means for utilizing said one of said plurality of firewalls, to said one of said plurality of computer systems; and in response to a determination to not forward a request, instruction means for prohibiting access, utilizing said one of said plurality of firewalls, to said one of said plurality of computer systems.

22. The product according to claim 19, further comprising instruction means for establishing said plurality of different firewalls within said firewall service, each one of said plurality of different firewalls offering a different level of security to said one of said plurality of computer systems.

23. The product according to claim 22, further comprising:

instruction means for permitting a first subscriber utilizing a first one of said plurality of computer systems to subscribe to said firewall subscription service to utilize a first one of said plurality of different firewalls, wherein said first one of said plurality of computer systems receives a first level of security; and instruction means for permitting a second subscriber utilizing a second one of said plurality of computer systems to subscribe to said firewall subscription service to utilize a second one of said plurality of different firewalls, wherein said second one of said plurality of computer systems receives a second level of security.

24. The product according to claim 22, further comprising instruction means for assigning a unique login identifier to each of said customers who subscribed to said firewall subscription service, said unique login identifier being used to uniquely identify each of said subscribers.

25. The product according to claim 24, further comprising:

instruction means for receiving, utilizing said firewall subscription service, a login identifier;

instruction means for identifying, utilizing said firewall subscription service, one of said subscribers utilizing said login identifier;

instruction means for determining, utilizing said firewall subscription service, one of said plurality of different firewalls which is associated with said one of said subscribers;

instruction means for identifying, utilizing said firewall subscription service, a client computer system currently being utilized by said one of said subscribers; and instruction means for utilizing said one of said plurality of different firewalls to protect said client customer computer system when said client computer system is coupled to said external network through said one of said plurality of different firewalls.

26. The product according to claim 25, further comprising:

instruction means for determining a fixed network address of said client computer system currently being utilized by said one of said subscribers;

instruction means for assigning a dynamic network address to said client computer system, said client computer system utilizing said dynamic network address when communicating utilizing said external network; and instruction means for intercepting, utilizing said one of said plurality of different firewalls, each transmission from said external network to said dynamic network address.

27. The product according to claim 22, further comprising:

instruction means for permitting said subscriber to select one of said plurality of different firewalls;

instruction means for utilizing said one of said plurality of different firewalls to intercept communications transmitted via said external network to a client computer system being utilized by said subscriber;

instruction means for permitting said subscriber to select a different one of said plurality of different firewalls; and in response to a selection of said different one of said plurality of different firewalls, instruction means for utilizing said different one of said plurality of different firewalls to intercept communications transmitted via said external network to said client computer system being utilized by said subscriber.

* * * * *